United States Patent [19]

Sands

[11] 3,995,655

[45] Dec. 7, 1976

[54] APPARATUS FOR AND METHOD OF MAKING A SERVICE LINE CONNECTION THROUGH A FITTING

[75] Inventor: Robert E. Sands, Shelbyville, Ill.

[73] Assignee: Mueller Co., Decatur, Ill.

[22] Filed: Oct. 7, 1975

[21] Appl. No.: 620,502

[52] U.S. Cl. .............................. 137/318; 285/197; 408/67; 408/92

[51] Int. Cl.² ........................................ F16K 43/00

[58] Field of Search .......... 137/317, 318, 319, 320, 137/15; 285/197, 198, 199; 408/22, 67, 92, 111, 117, 118

[56] References Cited

UNITED STATES PATENTS

| | | | |
|---|---|---|---|
| 2,414,911 | 1/1947 | Temple | 137/318 |
| 3,272,033 | 9/1966 | Leopold, Jr. et al. | 137/318 |
| 3,349,792 | 10/1967 | Larkin | 137/318 |
| 3,620,245 | 11/1971 | Finney | 137/318 |
| 3,773,067 | 11/1973 | Ray | 137/318 |
| 3,870,431 | 3/1975 | Luckenbill et al. | 408/111 |

Primary Examiner—William R. Cline
Assistant Examiner—G. L. Walton
Attorney, Agent, or Firm—Cushman, Darby & Cushman

[57] ABSTRACT

An apparatus and method for opening a flow-way in a main when the main is to be connected to a secondary main or service line. The apparatus includes a fitting arranged to be at least temporarily secured to the main, the fitting being provided with a cutter member for preliminarily cutting a coupon from the main to form a preliminary hole in the main and a tapping tool for progressively enlarging the hole to a predetermined size, the tapping tool directing the material from around the hole as the hole is being progressively enlarged in the predetermined direction. The tapping tool remains in the fitting and in the hole formed in the main to function as an internal mechanical connector for holding the fitting securely on the main.

16 Claims, 17 Drawing Figures

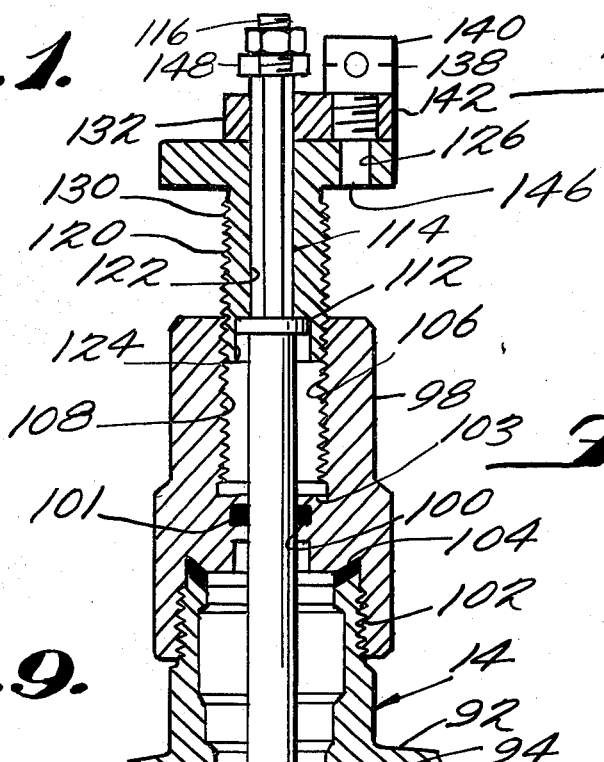
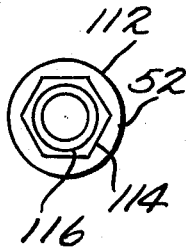
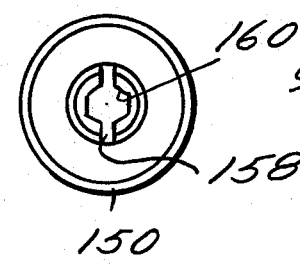
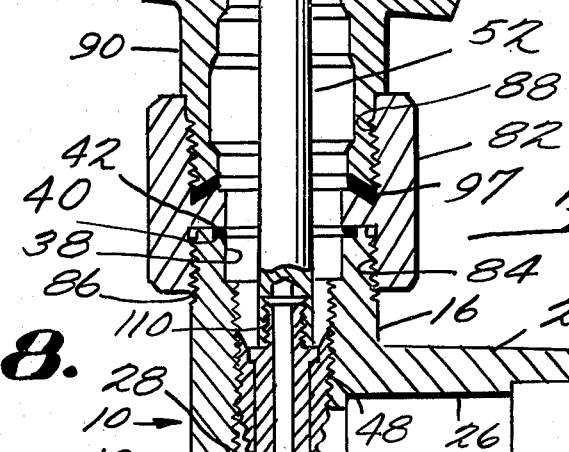
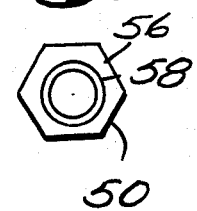
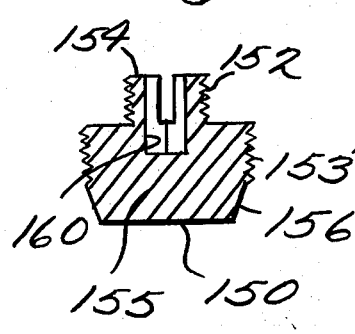
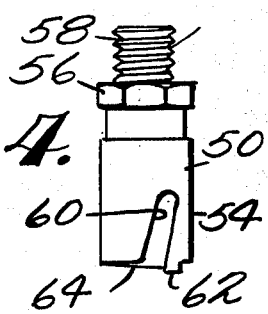

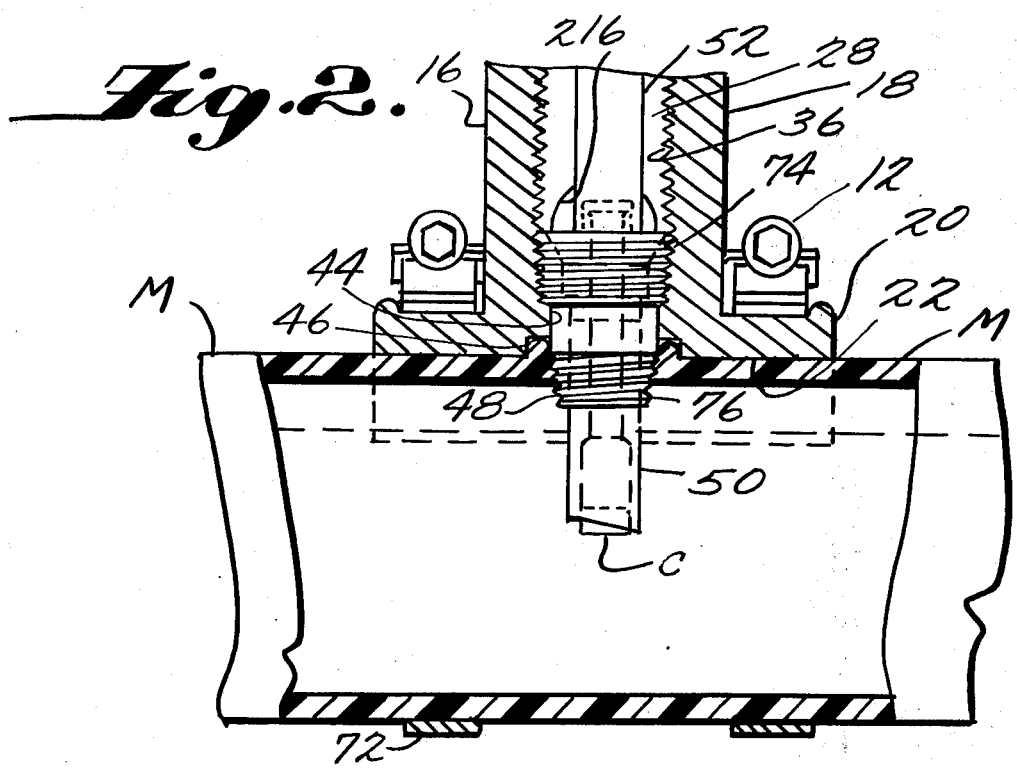
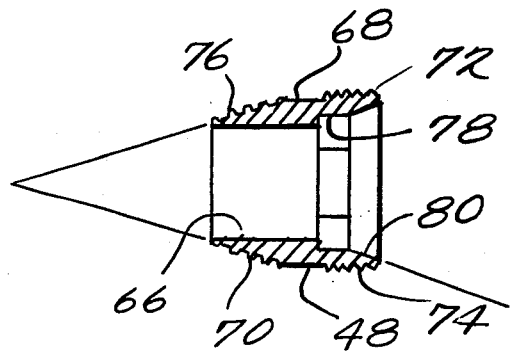
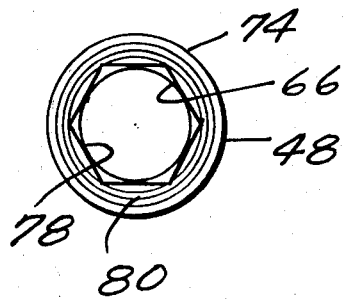
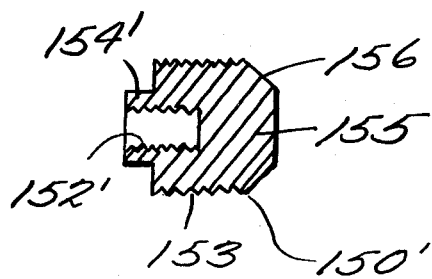
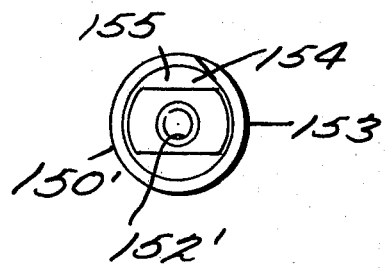

U.S. Patent   Dec. 7, 1976   Sheet 3 of 3   3,995,655
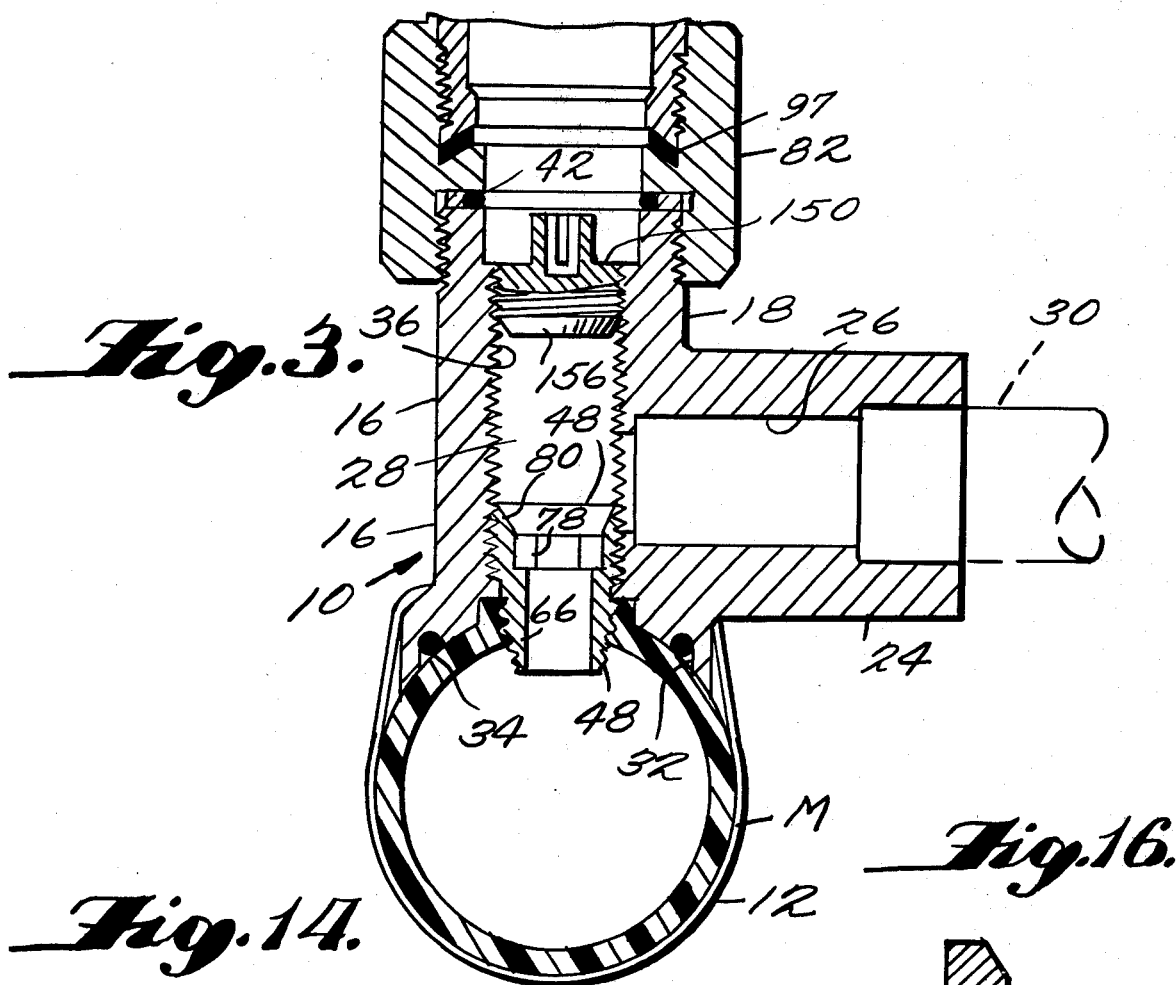
Fig. 3.
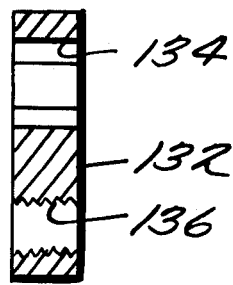
Fig. 14.
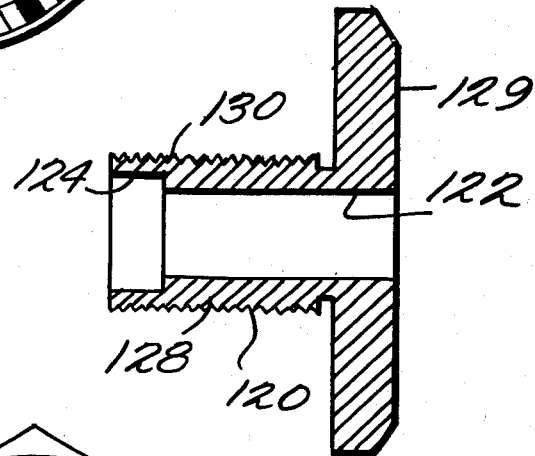
Fig. 16.
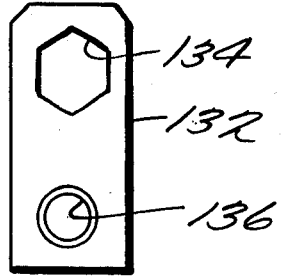
Fig. 15.
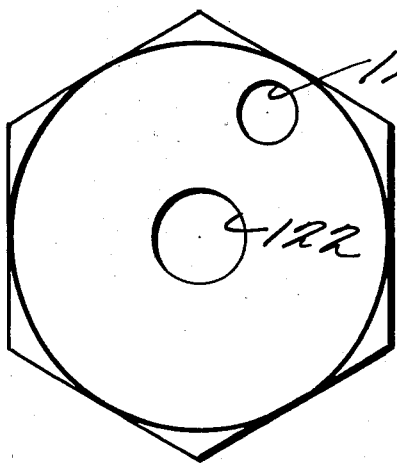
Fig. 17.

APPARATUS FOR AND METHOD OF MAKING A SERVICE LINE CONNECTION THROUGH A FITTING

The present invention relates generally to improvements in a self-tapping fitting assembly and a method for opening a flow-way from a main to a secondary main or service line and, more particularly, to an improved fitting having means to preliminarily form a hole in the main by cutting a coupon therefrom and then progressively enlarging the hole with a tapping tool while subsequently utilizing the tapping tool as a permanent internal connector between the main and the fitting.

BACKGROUND OF THE INVENTION

Heretofore self-tapping fitting assemblies, such as service tees, nipples, saddles, or the like have been utilized in fluid distribution systems, such as water, gas, or the like, in connecting a main to a secondary main or service line while the main is dry or while the main is under pressure of the fluid, this latter connection being made without the escape of the fluid from the main to atmosphere. Such prior arrangements have used drilling machines connected to the fittings through which coupon cutters, drills or the like were advanced through a valve and through the fitting to form a hole in the main.

In most of the prior art devices, the self-tapping fitting, in most instances, was permanently attached to the main at a position where the hole in the main was to be tapped. More recently and with the advent of the use of plastic pipe, efforts have been made to at least preliminarily attach the fitting to the main and then form the hole in the main and provide an internal connector between the main and the fitting for at least assisting in holding the fitting permanently on the main and in some instances providing the primary hold means between the main and the fitting.

In one such recent effort, the through bore of a fitting was threaded interiorly for receiving a tapping tool for cutting a coupon from the main, the tapping tool being provided with exterior threads to cooperate with the threads of the through bore for advancing the same and a second set of exterior threads for retaining the tapping tool as an internal connector between the main and the fitting. In this type of an arrangement the coupon, which often times remains tightly gripped or wedged in the cutting tool was difficult to remove from the cutting tool, especially when a thick wall pipe was tapped.

Still other arrangements were contemplated for providing an internal connector between the main and the self-tapping fittings. In one such arrangement a coupon cutter member was utilized to form the hole by cutting a coupon from the main and then an insert was axially driven into the hole and its lower end had to then be flared outwardly to prevent the insert from being blown out of the hole when the service line was put into operation. The insert was provided with barbs on its exterior for the purpose of biting into both the fitting and the main and even with such barbs the lower edge of the tubular insert still had to be flared outwardly to make a permanent connection.

Still further efforts were made to provide an internal mechanical fastening means by utilizing the material being removed in the forming of the hole as a mechanical fastening means between the main and the fitting, the material being swaged outwardly of the main into the through bore of the fitting. Where the material in and of itself was not of sufficient strength to function fully as a mechanical fastening means, a reinforcing sleeve was inserted into the interior of the hole and the upset material defining the finished hole.

The prior art arrangements were somewhat limited in their use in that they could only be used on pipes of certain soft materials such as plastic pipes or asbestos cement pipes or soft metal pipes and in most instances the pipes had to be of thin wall construction.

PRIOR ART

The prior art devices and methods relating to the setting up of a flow-way from a main to a secondary main or service line or relating to cutters for use in tapping holes through fittings are as follows:

| NUMBER | NAME | DATE |
| --- | --- | --- |
| 2,973,976 | STEINEN | March 7, 1961 |
| 3,094,137 | BURKE | June 18, 1963 |
| 3,307,435 | FLOREN | March 7, 1967 |
| 3,349,792 | LARKIN | Oct. 31, 1967 |
| 3,620,245 | FINNEY | Nov. 16, 1971 |
| 3,734,112 | FINNEY ET AL. | May 22, 1973 |
| 3,756,261 | MINCHHOFF | Sept. 4, 1973 |

BRIEF SUMMARY OF THE INVENTION

The present invention involves a self-tapping fitting assembly for forming a hole in a main, the assembly comprising a fitting having a through bore and arranged to be at least preliminarily or temporarily secured to the exterior of the main where the hole is to be formed, a cutter member having a cutting end for cutting a coupon from the main and a tubular tapping tool having a tapered end portion with an exterior cutting thread thereon of a predetermined lead, the cutter member extending through the tubular tapping tool and having its cutting end projecting from the tappered end portion of the tapping tool. Means are provided for detachably securing the cutter member to the tapping tool whereby the cutter member and the tapping tool may be rotated and advanced simultaneously with the cutter member preliminarily cutting the coupon from the main and then the tapping tool progressively enlarging and forming a hole in the main to a predetermined size. Means are further provided for removing the cutter member axially from the tapping tool after the hole has been formed so that the tapping tool remains partially in the formed hole and partially in the bore of the fitting to thereby assist in retaining the fitting on the main, the tapping tool now functioning as an internal connector member.

Further, the invention contemplates providing means to advance the tubular tapping tool and the cutter member as they are rotated, a distance per revolution which is less than the lead of the cutting thread on the tapping tool, whereby the material being removed from the hole is directed axially outwardly of the hole between the tapping tool and the fitting and is wedged tightly therebetween. The means of advancing the tubular tapping tool during revolutions of the same includes providing a thread on the exterior of the tubular tapping tool which cooperates with and is complementary to a thread on the interior of the through bore in the fitting.

The cutter member is detachably secured to the tubular tapping tool by providing a non-circular socket in the end of the tapping tool which receives a complementary non-circular enlargement on the cutter member. This permits the cutter member to be axially removed from the tubular tapping tool at the completion of the formation of the hole in the main.

The means for removing the cutter member axially from the tapping tool includes a boring bar threadedly attached to the cutter member and capable of rotating to advance the cutter member simultaneously with the tubular member, the boring bar being also capable of retraction by axial movement away from the tubular tapping tool to thereby axially retract the cutter member from the tapping tool.

The tubular tapping tool is provided with a frusto-conical seating surface at its outer end. A completion plug having an exterior thread complementary with the interior thread of the through bore and also having a frusto-conical seating surface on one end thereof is advanced in the through bore after the cutter member has been removed. The frusto-conical seating surface of the completion plug seals against the frusto-conical seating surface of the tubular tapping tool and thus the completion plug functions as a valve to keep the through bore of the fitting closed until such time it is desired to open a flow-way between the main and the secondary main or service line.

The invention further contemplates an improved method of forming a hole in a main through a through bore in a fitting at least temporarily secured to the main, the method including the steps of advancing and rotating the cutter member to make a preliminary hole in the main by cutting a coupon therefrom and then utilizing a tapping tool to progressively form the hole from which the coupon was cut. After the hole has been formed by first cutting the coupon from the main and then progressively increasing the size of the hole by the tapping tool, the cutter member is axially removed from the fitting through the through bore, leaving the tapping tool inserted in the hole and in the fitting to provide a mechanical fastening means between the main and the fitting to increase resistance of the fitting from twisting about the axis of the main or moving parallel to the axis of the main. Additionally, the tapping tool functions as a connector holding the fitting in intimate contact to the main and resists forces tending to pull the fitting away from the main.

Ancillary to the above, the method contemplates the step of causing the material around the hole being formed in the main to move outwardly in the main and wedging between a portion of the through bore of the fitting and the exterior of the tapping tool.

BRIEF DESCRIPTION OF THE DRAWINGS

FIG. 1 is a vertical sectional view, partly in elevation and illustrating the self-tapping fitting assembly of the present invention preliminarily attached to a main with the main being shown in cross-section and the view also illustrating a tool for operating the self-tapping fitting assembly.

FIG. 2 is an enlarged fragmentary cross-sectional view of the self-tapping fitting assembly mounted on the main with the main being shown partly in longitudinal section and partly in elevation and with the cutter member of the fitting having cut a coupon from the pipe and the tapping tool having progressively enlarged the size of the hole from which the coupon was cut.

FIG. 3 is a fragmentary sectional view similar to FIG. 1 but enlarged and showing the completed hole with the tapping tool functioning as an internal connector between the main and the fitting and with a completion plug being inserted into the fitting to close off the flow-way from the main.

FIG. 4 is an enlarged side elevational view of the cutter member for cutting the coupon from the main.

FIG. 5 is a top plan view of the cutter member of FIG. 4.

FIG. 6 is an enlarged fragmentary side elevational view of the upper portion of the boring bar for advancing the cutter member and the tapping tool simultaneously and for axially removing the cutter member from the fitting.

FIG. 7 is a top plan view of the boring bar of FIG. 6.

FIG. 8 is a cross-sectional view through a completion plug for use with the fitting after the hole in the main has been formed.

FIG. 9 is a top plan view of the completion plug of FIG. 8.

FIG. 10 is a vertical sectional view through a modified form of completion plug.

FIG. 11 is an elevational view looking from the left to the right of FIG. 10.

FIG. 12 is a vertical sectional view through the tubular tapping tool.

FIG. 13 is an end elevational view of the tubular tapping tool looking from the right of FIG. 12.

FIG. 14 is an enlarged cross-sectional view through the driver lock element of the drive means for the boring bar.

FIG. 15 is an elevational view of the driver lock element of FIG. 14 looking from the right to the left of FIG. 14.

FIG. 16 is an enlarged sectional view of the driver member for the cutter member and tubular tapping tool.

FIG. 17 is an elevational view of the driver member looking from the right to the left of FIG. 16.

DETAILED DESCRIPTION OF THE INVENTION

Referring now to the drawings wherein like reference or character numerals represent like or similar parts, there is disclosed in FIG. 1 a self-tapping fitting assembly generally designated at 10 and at least temporarily or preliminarily attached to a main M by means of stainless steel clamps or clamp assemblies 12. A tool generally designated at 14 is shown attached to the self-tapping fitting assembly 10 for actuating the same to form a hole in the main M as will be described in more detail later in the specification.

The self-tapping fitting assembly includes a fitting 16 such as a tee, the fitting 16 including a body portion 18 having at its lower end a saddle portion 20 provided with an arcuate-shaped surface 22 complementary to the exterior surface of the main M. A lateral outlet 24 having a lateral bore 26 therein opens to a threaded through bore 28 of the body portion 18 of the fitting 16. The lateral outlet 24 is arranged to receive a secondary main or service line 30 which extends to an ultimate point of use such as a building or a home. The arcuate-shaped surface 22 to which the through bore 28 opens is provided with a groove 32 surrounding the opening of the through bore 28 to the surface 22, the groove or recess 32 being provided with a seal, such as an O-ring 34, for making at least a preliminary seal around the area where the hole is to be formed in the main M.

While the main M is shown as a plastic main such as polyvinyl chloride (PVC), polyethylene (PE), polybutylene (PB) and the like, the main M may also be made of asbestos cement (AC), copper, cast iron or steel pipe. Also, as shown in FIG. 1, the fitting 16 may be made of a plastic material such as those previously mentioned or it may be metal. While the fitting 16 is shown at least temporarily or preliminarily attached to the main M by the stainless steel clamps 12, it will be appreciated that where the fitting is made of plastic and the main M is also of plastic, the fitting could be attached by solvent welding, fusion welding, or a bonding operation. Where the fitting 16 is metal and the main M is also metal, it may be attached by mechanical retaining devices, such as the strap clamps 12 or it may be welded in the usual manner. However, it will be appreciated that the present invention is primarily concerned with mountings of the fitting to the main wherein the fitting could be subjected to twisting about the axis of the main, moving parallel to the axis of the main or to forces tending to pull the fitting from the main and it is essential that an internal connector member be provided so as to provide a mechanical attachment which insures strength and rigidty to the connection of the fitting to the main to thereby assist in retaining the fitting on the main.

As previously mentioned, the fitting 16 is provided with a through bore 28, the through bore having an interior thread 36 extending from adjacent the upper end of the body 18 of the fitting to adjacent the lower end of the saddle portion of the fitting. In more detail, the fitting is provided with a counterbore 38 at its upper end and an annular groove 40 outwardly of the counterbore for the reception of a seal, such as an O-ring 42. At the lower end and as best shown in FIG. 2 the threads 36 of the through bore 28 terminate in a reduced annular section 44 of the through bore and then there is provided a counterbore 46 at a position where the through bore 28 opens to the arcuate surface 22 of the saddle 20.

The self-tapping fitting assembly 16 is provided with a tubular tapping tool 48 and a coupon cutter member 50, the tubular tapping tool 48 and the coupon cutter member 50 being simultaneously rotated and advanced to first cut a coupon C from the main M to form a hole with the hole being subsequently progressively enlarged by the tubular tapping tool 48 to a predetermined size. A boring bar 52 in the drilling tool or machine 14 is utilized to both rotate and advance the tapping tool 48 and the cutter member 50 as well as to retract axially the cutter member 50 while leaving the tapping tool 48 positioned partially in the hole formed and partially in the body 18 of fitting 16 (FIG. 3).

In more detail, and referring to FIGS. 4 and 5, the cutter member 50 is shown as being of the type disclosed in U.S. Pat. No. 3,870,431 issued Mar. 11, 1975 to Luckenbill et al. and assigned to the same assignee as this application and to that extent the disclosure of this patent is included herein by reference. Of course, any annular-shaped cutter member having another cutting configuration for cutting coupons from mains may be used with the present invention. To very briefly describe the cutter member as shown, it will be noted that it is provided with an annular body member 54 having an enlargement 56 of non-circular cross-section, preferably hexagonal in shape, adjacent its upper end. The body member 54 is further provided with a reduced shank portion 58 which is exteriorly threaded for reception in a threaded bore in the end of the boring bar. The cutter member includes a slot 60 extending generally lengthwise of the body member 54 and a tooth 62 of short arcuate extent, projects axially from the end surface 64 of the body member. Rotation and advancemennt of the cutter member 50 will cause a coupon C to be cut from the main M.

Referring now to FIGS. 12 and 13, the tapping tool is disclosed and it is provided with a bore 66 extending therethrough, a body portion 68, the body portion terminating in a tapered-end portion 70 at one end thereof and a generally cylindrical portion 72 at the other end thereof which is provided with an exterior thread 74 complementary to and of the same lead as the thread 36 in the through bore. The tapered-end portion 70 of the tapping tool 48 is provided with an exterior cutting or swaging thread 76 having a lead greater than the lead of the thread 74 so that the material progressively removed from the hole by the tapping tool is directed outwardly of the hole. The tapping tool 48 functions somewhat similarly to the tapping elements disclosed in U.S. Pat. No. 3,620,245 with regard to the direction of the removal of the material surrounding the hole being progressively enlarged by the cutting thread 76. The end portion of the bore 66 in tapping tool 48 away from the tapered-end portion 70 of the body member 68 is provided with an enlarged non-circular socket 78, preferably hexagonal in cross-sectional shape and complementary to the non-circular enlargement 56 on the cutter member 50. Outwardly of the non-circular socket 78 there is provided a frusto-conical seating surface 80, the purpose of which will be described in more detail later in the specification.

The drilling tool or machine 14 which is adapted to be attached to the fitting 16 includes a tubular adapted 82 threaded at one end as indicated at 84 so that it can be attached to the threaded end 86 of the body 18 of fitting 16. The other end of the tubular adapter is interiorly threaded as indicated at 88. The adapter receives a body member 90 of the tool or machine 14, the body member 90 in this instance being a plug-type valve 92 having a rotary plug 94 through which a through bore 96 extends. A seal 97 is provided between the adapter 82 and the plug valve 92 and the O-ring 42 provides a further seal between the adapter and the fitting 16. Attached to the other end of the body member is a cap-type ring nut 98 having a bore 100 therethrough, the nut 98 being arranged to be threadedly received, as indicated at 102, on the upper end of the body member 90 and a seal 104 is provided between the cap-type nut 98 and the body member 90. The bore 100 opens at its upper end to an enlarged counterbore 106 which is provided with an interior thread 108 having the same lead as the thread 36 of the through bore 28 of the fitting 16. An annular groove 101 in the bore 100 is provided with an O-ring seal 103 which cooperates with the boring bar 52 to prevent leakage of fluid after the cut is made and until the boring bar is retracted through valve 92 with the valve being subsequently closed.

The boring bar 52 has at its lower end, an internally threaded bore 110 for reception of the threaded shank 58 of the cutter member 50. The upper end of the boring bar 52, as best shown in FIGS. 6 and 7, is provided with a circular enlargement 112, a non-circular shank portion 114 extending therefrom and preferably hexagonal in cross-section and a threaded end portion 116 of reduced diameter with respect to the minimum cross-sectional dimension of the non-circular portion 114.

Referring now to FIGS. 14–17 inclusive, therre is provided a cutter drive member 120 having a circular bore 122 therethrough of a diameter greater than the maximum cross-sectional diameter of the non-circular portion 114 of the boring bar. The bore 122 terminates at its inner end in a counterbore 124 which is arranged to receive the enlargement 112 on the boring bar 52. The head portion 129 of the cutter drive member 120 which is hexagonal in shape is provided with a hole 126 therethrough radially-spaced from the axis of the bore 122. The main body portion 128 of the cutter drive member 120 is exteriorly threaded as indicated at 130, these threads being complementary to the threads 108 of counterbore 106 and, thus, they have the same lead as the threads 108, as well as the threads 36 in the bore 28 of the fitting 16.

In FIGS. 14 and 15 there is disclosed a driver lock member 132 which is provided with a hexagonal aperture or bore 134 therethrough complementary to the hexagonal end portion 114 of the boring bar. Additionally, the driver lock member is provided with a threaded bore 136 for receiving a stud 138 having a head 140, a threaded portion 142 and an end portion 146 for extending through the hole 126 in the cutter drive member 120.

Usually the fitting 16 is supplied to the gas or water distribution company with the tapping tool 48 threaded into the upper end of the threaded bore 28. After the fitting 16 has been preliminarily and/or temporarily attached to the main M by means of the clamp members 12 or the like, the tool 14 with the disengagement cap-type nut 98 removed is then attached to the fitting 16 by means of the adapter 82. The plug valve member 92 is then moved to its opened position as shown in FIG. 1 so that the operation for forming the hole in the main can be continued. The boring bar 52 is attached to the cutter member 50 and the boring bar with the cutter member attached is then slipped through the nut 98 and the nut in turn is attached to the valve body 92. The boring bar at this stage of the operation can be moved axially downwardly with the cutter member 50 attached thereto and the cutter member can be directed through the bore 66 of the tapping tool 48 until the enlargement 56 on the cutter member seats in the socket 78 of the tapping tool 48.

Once the above described operation is completed, then the drive member 120 is slipped over the hexagonal end 114 of the boring bar and is threaded slightly into the through bore 106 of the nut 98. This will not turn the boring bar 52 since the bore 122 through the drive member 120 is circular and is of a greater diameter than the major cross-sectional diameter of the hexagonal end portion 114 of the boring bar. After this has been accomplished then the driver lock member 132 is slipped onto the hexagonal end portion 114 of the boring bar 52 and is rotated to align its threaded bore 136 with the bore 126 in the lock member 120. The stud 138 is then positioned so as to lock the drive member and the lock member together and lock nuts 148 are threaded onto the upper end of the boring bar 52. Now the machine is in position for the forming of the hole and any suitable turning tool such as a wrench or the like may be applied to the head 129 of the drive member 120 to rotate the same and advance simultaneously the cutter member 50 and the tapping tool 48. The cutter member 50 initially engages the wall of the main M as shown in FIG. 2 and cuts therefrom a coupon C and the hole formed by the coupon C is progressively enlarged as further rotation of the boring bar 52 advances the tapping tool 48 and its cutter thread 76. Since the thread 76 has a greater lead than the thread 74 the material cut from around the hole will be directed upwardly into the counterbore 46 at the end of the fitting wedging tightly between the fitting and the tapping tool.

When the tapping tool 48 and the cutter member 50 have been advanced to the position shown in FIG. 2, the tapping tool will bottom at the end of the thread 36 of the through bore 28. This will indicate to the operator that completion of the formation of the hole has been accomplished and he can now proceed to remove the cutter member 50 from the tapping tool.

The removal of the cutter member 50 from the tubular tapping tool is accomplished by removing the stud 138 which locks the lock member 132 to the drive member 120 and then the drive member can be rotated to back the same out of the threaded bore 106 without turning the boring bar 52. The drive member 120 lifts the lock member 132 relative to the boring bar 52 until it hits the nuts 148 and then further rotation of the drive member 120 will merely retract the boring bar axially without rotation and lift the cutter member 50 out of the tapping tool 48.

Once the drive member 120 is free of the nut 98 the entire boring bar may be lifted vertically upwardly through the plug valve 92 and then the plug valve may be closed while the cutter member 50 is removed from the boring bar and replaced by a completion plug 150 (FIGS. 8 and 9). The completion plug 150 is provided with threads 152 on its reduced shank portion 154 whereas the opposite end of the same is provided with a frusto-conical seating surface 156 which is complementary to the seating surface 80 of the tapping tool 48. Additionally, the completion plug 150 is provided with an exterior thread 153 on its body 155 which is complementary to the thread 36 in the bore 28 of the fitting 16. Once the completion plug 150 has been attached to the boring bar 52, then the boring bar is moved downwardly by means of the drive member and lock member through the again opened valve 92. Since the boring bar is being rotated and advanced with the completion plug thereon, the completion plug threads into the threads and is then seated against the tubular tapping tool 48. In order to remove the boring bar from the completion plug 150, the shank portion 154 is provided with slots 158 therein and the plug is further provided with a hexagonal socket 160 extending through the shank portion 154 into the body of the completion plug and by such an arrangement a vertical movement upward of the boring bar 52 strips the threads 152 from the threads at the lower end of the boring bar. This situation can occur because the completion plug 150 is made of a relatively soft material such as plastic. When it is desired to back the completion plug to the position shown in FIG. 3, a hexagonal-shaped tool can be inserted into the hexagonal socket 160 and the completion plug may be backed upwardly past the opening of the bore 26 to the through bore 28 and thus a flow-way is opened to the service line or to a secondary main 30. Once service has been opened or at such times when it is desired to close off the upper end of the fitting 16, a dirt cap (not shown) can be threaded on to the fitting 16 in place of the adapter 82.

By the arrangement just described, it will be appreciated that a flow-way can be made between the main M and the secondary main or service line 30 regardless of whether main M is under pressure of fluid or is dry. Once the hole has been made in the main M, the tubular tapping tool 48 remains in the fitting 16 and partially in the main M as shown in FIG. 3 and thus provides an internal connector between the main M and the fitting 16 to prevent the fitting 16 from twisting axially of the main, slipping axially of the main or resisting forces tending to pull the fitting from the main. Because of the differential threads on the tubular tapping tool, this internal connector tightly holds the fitting to the main and in situations where the main is not permanently fixed to the fitting by fusion bonding, welding or the like, the tubular tapping tool will function as a primary means of retaining the two elements together.

FIGS. 10 and 11 disclose a modified completion plug 150' having a frusto-conical seating surface 156 at one end thereof and an exterior thread 153 on its body 155 as in the plug 150. However, the completion plug 150' is provided with a non-circular projection or lug 154' having an interiorly threaded closed bottom bore 152' therein. The plug 150' is attached to the boring bar 52 by using an adapter (not shown) and is inserted in a similar manner to the plug 150. A fork-shaped tool (not shown) may be used to back the completion plug 150' from its seat on the frusto-conical seating surface 80 of the tapping tool 48.

The terminology used in this specification is for the purpose of description and not limitation, the scope of the invention being defined in the claims.

What is claimed is:

1. An assembly for forming a hole in a main comprising:
    a fitting having a through bore, said fitting at one end of said through bore being adapted to be secured to the exterior of the main where the hole is to be formed;
    an annular shaped cutter member having a cutting end for cutting a coupon from the main;
    a tubular tapping tool having a tapered end portion with an exterior cutting thread thereon of predetermined lead, said cutter member extending through said tubular tapping tool and having its cutting end projecting from the tapered end portion thereof;
    means detachably securing said cutter member to said tapping tool whereby said cutter member and said tapping tool may be rotated and advanced simultaneously with said cutter member preliminarily cutting a coupon from the main to form a hole and then said tubular tapping tool further forming and progressively enlarging the hole in the main, and whereby said annular shaped cutter member may be slid axially from said tapping tool after the hole is formed; and,
    means for removing the cutter member and the cut coupon therein slidably and axially from said tapping tool after the hole has been formed in the main so that the tapping tool remains partially in said hole and partially in the bore of said fitting to thereby assist in retaining the fitting on said main.

2. An assembly as claimed in claim 1 in which said through bore of said fitting is provided with an interior thread having a predetermined lead less than the predetermined lead of the exterior cutting thread of said tubular tapping tool and in which said tubular tapping tool is further provided with a cylindrical end portion extending from said tapered end portion, said cylindrical end portion having an exterior thread complementary to the thread in the through bore of said fitting whereby when said tubular tapping tool is enlarging and forming the hole in said main, the material removed in the forming of the holle is directed axially upwardly of the hole.

3. An assembly as claimed in claim 2 in which said fitting is provided with a counterbore at the end of said through bore for receiving the material removed in the forming of the hole and wedging the same tightly between the fitting and the tubular tapping tool.

4. An assembly for forming a hole in a main comprising:
    a fitting having a through bore, said fitting at one end of said through bore being adapted to be secured to the exterior of the main where the hole is to be formed;
    a cutter member having a cutting end for cutting a coupon from the main;
    a tubular tapping tool having a tapered end portion with an exterior cutting thread thereon of predetermined lead, said cutter member extending through said tubular tapping tool and having its cutting end projecting from the tapered end portion thereof;
    means detachably securing said cutter member to said tapping tool whereby said cutter member and said tapping tool may be rotated and advanced simultaneously with said cutter member preliminarily cutting a coupon from the main and then said tubular tapping tool enlarging and forming the hole in the main, said means detachably securing said cutter member to said tubular tapping tool including a non-circular socket in the end of said tapping tool and a complementary non-circular enlargement on said cutter member for reception into said non-circular socket; and,
    means for removing the cutter member axially from said tapping tool after the hole has been formed in the main so that the tapping tool remains partially in said hole and partially in the bore of said fitting to thereby assist in retaining the fitting on said main.

5. An assembly as claimed in claim 4 in which said tubular tapping tool is provided with an end portion extending from its tapered end portion and having an exterior thread thereon, and in which said through bore of said fitting is provided with an interior thread complementary to the exterior thread on said tapping tool, whereby rotation of said cutter member rotates said tapping tool and advances both said tapping tool and said cutter member to preliminarily cut a coupon from the main and then form the hole in the main.

6. As assembly as claimed in claim 5 in which said means for removing the cutter member axially from said tapping tool after the hole has been formed in the main includes a boring bar threadedly attached to said cutter member and, means to rotate said boring bar to advance said cutter member and said tapping tool simultaneously, and means to axially move said boring bar independently of said rotating means whereby said cutter member may be withdrawn through said tapping tool.

7. An assembly as claimed in claim 5 in which said interior thread on said through bore of said fitting and the exterior thread on the end portion of said tubular tapping tool each have a lead which is less than the lead of the exterior cutting thread on the tapered end portion of said tubular tapping tool whereby material removed in forming of the hole is directed axially upwardly of the hole.

8. An assembly as claimed in claim 7 in which said fitting is provided with a counterbore at the end of said through bore for receiving the material removed in the forming of the hole and wedging the same tightly between the fitting and the tubular tapping tool.

9. An assembly as claimed in claim 5 wherein said tubular tapping tool includes a frusto-conical seating surface outwardly of said non-circular socket, and said assembly includes a completion plug having an exterior thread complementary with the interior thread of said through bore and a frusto-conical seating surface at one end thereof, said completion plug being inserted into the through bore of said fitting and arranged to seat against the frusto-conical seating surface of said tubular tapping tool when said cutter member has been removed axially from said tapping tool and the fitting.

10. An assembly as claimed in claim 9 in which said completion plug is provided on its end opposite the end having the frusto-conical seating surface with a non-circular projection for receiving a fork-shaped tool to retract the same.

11. An assembly as claimed in claim 10 in which said completion plug includes a threaded socket in the end having the non-circular projection for threadedly receiving the boring bar whereby the completion plug can be advanced to its seating position.

12. An assembly as claimed in claim 9 in which said completion plug is provided on its end opposite the end having the frusto-conical seating surface with an annular projection having axially extending slots therein, said projection having an exterior thread thereon for receiving the boring bar so that it can be advanced by the boring bar to its seated position and then the boring bar stripped from the thread on the annular projection by axial movement away from the same.

13. An assembly as claimed in claim 12 in which said completion plug is provided with a closed bottom bore extending through the annular projection and having a non-circular shape in cross-section for reception of a complementary shaped tool whereby the completion plug can be retracted from its seated position.

14. A method of forming a hole in a main through a through bore in a fitting at least temporarily secured to the main, the fitting having a hollow tapping tool with a threaded tapered cutting portion and an annular shaped coupon cutter member extending through and out of the tapping tool, the steps comprising:

advancing and rotating simultaneously the cutter member and tapping tool toward the main with the cutter member making initial engagement and cutting from the main a coupon;

continuing the rotation of the cutter member and the tapping tool with the threaded tapered cutting portion progressively forming and enlarging the hole from which the coupon was cut; and, then slidably and axially retracting the cutter member with the cut coupon therein from the tapping tool and the fitting while leaving the tapping tool inserted in the hole and in the fitting so as to provide a mechanical fastening means between the main and the fitting to increase resistance of the fitting from twisting about the axis of the main or moving parallel to the axis of the main.

15. A method as claimed in claim 14 in which the advancing and rotating of the cutter member and the tapping tool per each revolution is controlled to be less than the lead of the threaded tapered portion of the tapping tool thereby causing the material around the hole being formed in the main to be moved outwardly of the main wedging between the through bore of the fitting and the tapping tool.

16. A method as claimed in claim 15 including the further step of inserting a closure plug into the through bore of the fitting after the cutter member has been removed therefrom and seating the completion plug against the hollow tapping tool to temporarily close off the hole formed in the main.

* * * * *